(12) United States Patent
Koketsu et al.

(10) Patent No.: US 10,875,506 B2
(45) Date of Patent: Dec. 29, 2020

(54) HOUSING DEVICE

(71) Applicant: HONDA MOTOR CO., LTD., Tokyo (JP)

(72) Inventors: Tomoyuki Koketsu, Saitama (JP); Kenichi Etsunagi, Saitama (JP); Michihito Okado, Saitama (JP); Takumi Shiiyama, Saitama (JP); Ryo Oshima, Saitama (JP); Ryuichi Kimata, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/563,933

(22) Filed: Sep. 9, 2019

(65) Prior Publication Data

US 2020/0001836 A1      Jan. 2, 2020

Related U.S. Application Data

(63) Continuation of application No. PCT/JP2018/011551, filed on Mar. 22, 2018.

(30) Foreign Application Priority Data

Mar. 23, 2017   (JP) ................. 2017-058092

(51) Int. Cl.
   B60R 16/04      (2006.01)
   B60S 5/06       (2019.01)
   (Continued)

(52) U.S. Cl.
   CPC .............. B60S 5/06 (2013.01); B60K 1/04 (2013.01); B60L 50/50 (2019.02); B60L 53/80 (2019.02); *B60K 2001/0494* (2013.01)

(58) Field of Classification Search
   CPC .... B60S 5/06; B60S 5/00; B60L 53/80; B60L 53/00; B60L 53/30; B60L 53/31;
   (Continued)

(56) References Cited

U.S. PATENT DOCUMENTS 4,413,219 A  *  11/1983  Ducharme .......... H01M 2/1077
                                                     320/109
4,450,400 A  *   5/1984  Gwyn ................... B60L 50/66
                                                     320/109
(Continued)

FOREIGN PATENT DOCUMENTS

JP          S5762362 U      4/1982
JP          S6013668 U      1/1985
(Continued)

OTHER PUBLICATIONS

International Search Report and (ISA/237) Written Opinion of the International Search Authority for International Patent Application No. PCT/JP2018/011551, mailed by the Japan Patent Office dated May 1, 2018.

(Continued)

*Primary Examiner* — James M Dolak

(57) ABSTRACT

A housing device includes a first housing part and a second housing part arranged at different heights, each housing part to house a storage battery, and a first guide and a second guide to assist insertion of the storage battery into a respective one of the first housing part and the second housing part. The first guide and the second guide assist the insertion of the storage batteries in different respective manners.

24 Claims, 10 Drawing Sheets

(51) Int. Cl.
*B60L 50/50* (2019.01)
*B60L 53/80* (2019.01)
*B60K 1/04* (2019.01)

(58) Field of Classification Search
CPC .......... B60L 53/50; B60L 53/53; B60L 53/57;
B60L 53/60; B60L 53/67; B60L 50/50;
B60L 50/00; B60L 50/60; B60K 1/04;
B60K 2001/0494; B60K 2001/0455;
B60K 2001/0488; H01M 2/1077; H01M
2/1072; H01M 2/1083; H01M 2/1016;
H01M 2/1027; H01M 2/10; H01M 10/46;
H01M 2220/20
See application file for complete search history.

(56) References Cited

U.S. PATENT DOCUMENTS

| | | | | |
|---|---|---|---|---|
| 5,091,687 | A * | 2/1992 | Meyer | B60L 53/80 320/109 |
| 5,425,159 | A * | 6/1995 | Kluttermann | B65H 67/0428 104/34 |
| 5,612,606 | A * | 3/1997 | Guimarin | B60L 53/80 320/109 |
| 6,094,028 | A * | 7/2000 | Gu | H01M 10/441 104/34 |
| 6,371,230 | B1 * | 4/2002 | Ciarla | B60L 53/80 180/68.5 |
| 6,498,457 | B1 * | 12/2002 | Tsuboi | B60L 50/64 320/110 |
| 6,729,114 | B2 * | 5/2004 | Fillman | A01D 34/58 56/10.6 |
| 6,938,553 | B2 * | 9/2005 | Tamaki | B61C 17/06 104/34 |
| 7,004,710 | B1 * | 2/2006 | Quade | H01M 10/42 414/395 |
| 8,366,371 | B2 * | 2/2013 | Maniscalco | H01M 2/1077 104/34 |
| 8,461,804 | B1 * | 6/2013 | Capizzo | B60L 53/60 320/109 |
| 8,697,270 | B2 * | 4/2014 | Tan | H01M 10/658 429/99 |
| 8,875,826 | B2 * | 11/2014 | Franzen | B66F 9/063 180/68.5 |
| 8,900,737 | B2 * | 12/2014 | Kim | H01M 10/465 429/123 |
| 9,059,447 | B2 * | 6/2015 | Scheucher | H01M 2/1077 |
| 9,187,004 | B1 * | 11/2015 | Davis | B60L 53/30 |
| 9,358,895 | B2 * | 6/2016 | Avganim | B60L 50/66 |
| 9,564,620 | B2 * | 2/2017 | Kawaguchi | H01M 2/1077 |
| 9,650,022 | B2 * | 5/2017 | Yang | B60S 5/06 |
| 9,755,201 | B2 * | 9/2017 | Frazier | A47B 45/00 |
| 9,834,183 | B2 * | 12/2017 | Moskowitz | B60S 5/06 |
| 9,873,408 | B2 * | 1/2018 | Capizzo | B60L 53/36 |
| 9,873,409 | B2 * | 1/2018 | Corfitsen | B65G 47/57 |
| 10,040,359 | B2 * | 8/2018 | Chen | G07F 7/06 |
| 10,055,911 | B2 | 8/2018 | Luke | |
| 10,065,525 | B2 | 9/2018 | Chen | |
| 10,158,102 | B2 | 12/2018 | Wu | |
| 10,186,094 | B2 | 1/2019 | Wu | |
| 10,209,090 | B2 | 2/2019 | Luke | |
| 10,345,843 | B2 | 7/2019 | Luke | |
| 10,600,116 | B2 * | 3/2020 | Takatsuka | B60L 50/50 |
| 10,658,636 | B2 * | 5/2020 | Geshi | H01M 2/1077 |
| 10,688,876 | B2 * | 6/2020 | Takatsuka | B60L 58/13 |
| 10,727,548 | B2 * | 7/2020 | Park | H01M 10/6566 |
| 10,753,761 | B2 * | 8/2020 | Ricci | B60L 53/55 |
| 2007/0278915 | A1 | 12/2007 | Conrardy | |
| 2010/0145717 | A1 * | 6/2010 | Hoeltzel | B60L 53/305 705/1.1 |
| 2010/0292877 | A1 * | 11/2010 | Lee | B60L 50/66 701/21 |
| 2012/0160793 | A1 | 6/2012 | Kondo | |
| 2013/0026971 | A1 | 1/2013 | Luke | |
| 2013/0030580 | A1 | 1/2013 | Luke | |
| 2013/0030581 | A1 | 1/2013 | Luke | |
| 2013/0030608 | A1 | 1/2013 | Taylor | |
| 2013/0030630 | A1 | 1/2013 | Luke | |
| 2013/0030920 | A1 | 1/2013 | Wu | |
| 2013/0033203 | A1 | 2/2013 | Luke | |
| 2013/0116892 | A1 | 5/2013 | Wu | |
| 2014/0142786 | A1 | 5/2014 | Huang | |
| 2014/0251710 | A1 | 9/2014 | Juan | |
| 2014/0253021 | A1 | 9/2014 | Luke | |
| 2014/0266006 | A1 | 9/2014 | Luke | |
| 2014/0277844 | A1 | 9/2014 | Luke | |
| 2014/0279576 | A1 | 9/2014 | Luke | |
| 2015/0042157 | A1 | 2/2015 | Chen | |
| 2016/0221543 | A1 | 8/2016 | Corfitsen | |

FOREIGN PATENT DOCUMENTS

| | | |
|---|---|---|
| JP | 2001035459 A | 2/2001 |
| JP | 2002057470 A | 2/2002 |
| JP | 2009201711 A | 9/2009 |
| JP | 2010098702 A | 4/2010 |
| JP | 2012140205 A | 7/2012 |
| JP | 2014525229 A | 9/2014 |
| JP | 2014525230 A | 9/2014 |
| JP | 2014525231 A | 9/2014 |
| JP | 2014527390 A | 10/2014 |
| JP | 2014527689 A | 10/2014 |
| JP | 2014529117 A | 10/2014 |
| JP | 2014529118 A | 10/2014 |
| JP | 2014529119 A | 10/2014 |
| JP | 2014529392 A | 11/2014 |
| JP | 2014529982 A | 11/2014 |
| JP | 2014531699 A | 11/2014 |
| JP | 2014533480 A | 12/2014 |
| JP | 2015002005 A | 1/2015 |
| JP | 2015502881 A | 1/2015 |
| JP | 2015231837 A | 12/2015 |
| JP | 2015534927 A | 12/2015 |
| JP | 2016514357 A | 5/2016 |
| JP | 2016515063 A | 5/2016 |
| JP | 2016517257 A | 6/2016 |
| JP | 2016521389 A | 7/2016 |
| JP | 2016521393 A | 7/2016 |
| JP | 2016527871 A | 9/2016 |
| JP | 2016533154 A | 10/2016 |
| JP | 2016534518 A | 11/2016 |

OTHER PUBLICATIONS

Decision to Grant a Patent issued for counterpart Japanese Application No. 2017-058092, drafted by the Japan Patent Office dated Jan. 11, 2018.

Extended European Search Report for counterpart European Application No. 18771507.3, issued by the European Patent Office dated Feb. 17, 2020.

* cited by examiner

US 10,875,506 B2

HOUSING DEVICE

CROSS REFERENCE TO RELATED APPLICATION

This is a continuation application of International Application No. PCT/JP2018/011551 filed on Mar. 22, 2018, which claims priority to Japanese Patent Application No. 2017-058092 filed in JP on Mar. 23, 2017, the contents of each of which are incorporated herein by reference.

BACKGROUND

1. Technical Field

The present invention relates to a housing device.

2. Related Art

For example, a charging station is known which houses a storage battery for electric motorcycles and provides a user of an electric motorcycle with a fully-charged storage battery (for example, see Patent Literature 1).
Patent Literature 1: Japanese Translation of PCT International Application No. 2016-514357

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

DESCRIPTION OF EXEMPLARY EMBODIMENTS

Figure 1:
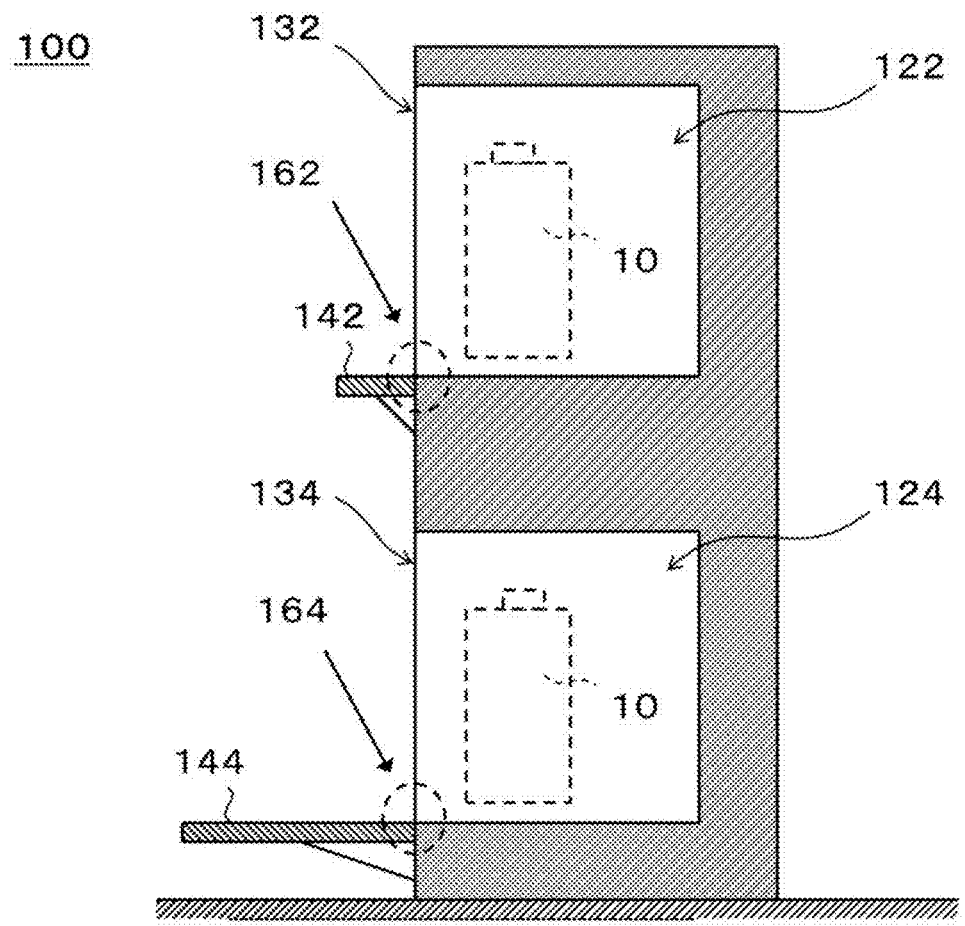
FIG. 1 schematically illustrates one example of a housing device 100.

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention. In the drawings, the same or similar parts may be denoted by the same reference sign, and the redundant description may not be repeated.

FIG. 1 schematically illustrates one example of a housing device 100. FIG. 1 may be one example of a cross section of the housing device 100. In this embodiment, for example, the housing device 100 includes a first housing part 122. A first opening 132 having a size available for carrying in or out the storage battery 10 may be formed in a part of the first housing part 122. In this embodiment, for example, the housing device 100 includes a second housing part 124. A second opening 134 having a size available for carrying in or out the storage battery 10 may be formed in a part of the second housing part 124. The first housing part 122 and the second housing part 124 may be arranged at different heights. In this embodiment, the first housing part 122 is arranged at a position higher than the second housing part 124. The first housing part 122 and the second housing part 124 may be arranged in the same casing. The housing device 100 may include three or more housing parts installed at different heights.

Each of the first housing part 122 and the second housing part 124 has a space for housing the storage battery 10. The type of the storage battery 10 is not limited particularly. The storage battery 10 may be any type of secondary battery. The storage battery 10 may be a portable storage battery. The size and the mass of the storage battery 10 are not limited particularly. The storage battery 10 may be 1 kg or more, 3 kg or more, 5 kg or more, or 10 kg or more.

In this embodiment, for example, the housing device 100 includes a first guide 142. The first guide 142 is used to assist the insertion of the storage battery 10 into the first housing part 122. In a case where the housing device 100 does not include the first guide 142, a peripheral part 162 of the first opening 132 functions as the first guide. The housing device 100 may include a mechanical mechanism (not illustrated) for moving or rotating the first guide 142. The housing device 100 may include a power source (not illustrated), such as a motor or an actuator, for moving or rotating the first guide 142.

At least a part of the first guide 142 may be connected to the peripheral part 162 of the first opening 132 or to the vicinity of the peripheral part 162. According to one embodiment, at least a part of the first guide 142 is fixed to the peripheral part 162 of the first opening 132 or to the vicinity of the peripheral part 162. According to another embodiment, at least a part of the first guide 142 is translationally arranged at the peripheral part 162 of the first opening 132 or in the vicinity of the peripheral part 162. For example, the first guide 142 slides along the inner surface of the first housing part 122. For example, the first guide 142 is normally housed inside the first housing part 122. When the storage battery 10 is being inserted into the first housing part 122, the first guide 142 slides along the bottom surface or the side surface of the first housing part 122, and at least a part of the first guide 142 protrudes to the outside of the first housing part 122. The protrusion portion of the first guide 142 is used to assist the insertion of the storage battery 10. At the same time when the storage battery 10 is housed inside the first housing part 122 or after the storage battery 10 is housed inside the first housing part 122, the first guide 142 may also be housed inside the first housing part 122.

According to still another embodiment, at least a part of the first guide 142 is rotatably arranged on the peripheral part 162 of the first opening 132 or the vicinity of the peripheral part 162. The first guide 142 may rotate about a certain rotational axis. For example, the first guide 142 rotates about a rotational axis perpendicular to the vertical direction or the height direction of the housing device 100. The first guide 142 may rotate about a rotational axis parallel to the vertical direction or the height direction of the housing device 100. For example, the first guide 142 is normally housed inside the first housing part 122. When the storage battery 10 is being inserted into the first housing part 122, the first guide 142 rotates about the connection portion of the first guide 142 and the peripheral part 162, and at least a part of the first guide 142 protrudes to the outside of the first housing part 122. The protrusion portion of the first guide 142 is used to assist the insertion of the storage battery 10. At the same time when the storage battery 10 is housed inside the first housing part 122 or after the storage battery 10 is housed inside the first housing part 122, the first guide 142 may also be housed inside the first housing part 122.

In this embodiment, for example, the housing device 100 includes a second guide 144. The second guide 144 is used to assist the insertion of the storage battery 10 into the second housing part 124. In a case where the housing device 100 does not include the second guide 144, a peripheral part 164 of the second opening 134 may function as a second guide. The housing device 100 may include a mechanical mechanism (not illustrated) for moving or rotating the second guide 144. The housing device 100 may include a power source (not illustrated), such as a motor or an actuator, for moving or rotating the second guide 144.

At least a part of the second guide 144 may be connected to the peripheral part 164 of the second opening 134 or to the vicinity of the peripheral part 164. According to one embodiment, at least a part of the second guide 144 is fixed to the peripheral part 164 of the second opening 134 or to the vicinity of the peripheral part 164. According to another embodiment, at least a part of the second guide 144 is translationally arranged on the peripheral part 164 of the second opening 134 or in the vicinity of the peripheral part 164. For example, the second guide 144 slides along the inner surface of the second housing part 124. For example, the second guide 144 is normally housed inside the second housing part 124. When the storage battery 10 is being inserted into the second housing part 124, the second guide 144 slides along the bottom surface or the side surface of the second housing part 124, and at least a part of the second guide 144 protrudes to the outside of the second housing part 124. The protrusion portion of the second guide 144 is used to assist the insertion of the storage battery 10. At the same time when the storage battery 10 is housed inside the second housing part 124 or after the storage battery 10 is housed inside the second housing part 124, the second guide 144 may also be housed inside the second housing part 124.

According to still another embodiment, at least a part of the second guide 144 is rotatably arranged on the peripheral part 164 of the second opening 134 or in the vicinity of the peripheral part 164. The second guide 144 may rotate about a certain rotational axis. For example, the second guide 144 rotates about a rotational axis perpendicular to the vertical direction or the height direction of the housing device 100. The second guide 144 may rotate about a rotational axis parallel to the vertical direction or the height direction of the housing device 100. For example, the second guide 144 is normally housed inside the second housing part 124. Further, when the storage battery 10 is inserted into the second housing part 124, the second guide 144 rotates about the connection portion of the second guide 144 and the peripheral part 164, and at least a part of the second guide 144 protrudes to the outside of the second housing part 124. The protrusion portion of the second guide 144 is used to assist the insertion of the storage battery 10. While the storage battery 10 is housed inside the second housing part 124 or after the storage battery 10 is housed inside the second housing part 124, the second guide 144 may also be housed inside the second housing part 124.

In this embodiment, the first guide 142 and the second guide 144 assist the insertion of the storage battery 10 in different respective manners. In one embodiment, the first guide 142 and the second guide 144 are different in at least one of (i) a shape of the guide, (ii) a dimension of the guide, (iii) a manner in which the guide holds the storage battery 10 (referred to as a holding manner in some cases), and (iv) a path of movement of the storage battery assisted by the guide.

In another embodiment, in a case where the first guide 142 and the second guide 144 are arranged rotatably, a range where the first guide 142 can rotate may be different from the range where the second guide 144 can rotate. In still another embodiment, in a case where the first guide 142 and the second guide 144 are arranged translationally, a range where the first guide 142 can slide may be different from a range where the second guide 144 can slide. Accordingly, the first guide 142 and the second guide 144 can assist the insertion of the storage battery 10 in different manners.

In this embodiment, the first guide 142 and the second guide 144 are different in length. Specifically, the second guide 144 is longer than the first guide 142. For example, the user lifts the storage battery 10 up to the height of the first opening 132, puts one end of the storage battery 10 on the first guide 142, and then inserts the storage battery 10 into the first housing part 122. In addition, the user puts the storage battery 10 on the second guide 144 and then inserts the storage battery 10 into the second housing part 124. Since the first opening 132 and the first guide 142 are positioned relatively high, a handling property of the storage battery 10 is improved if the first guide 142 is short.

In this case, the first guide 142 and the second guide 144 are different in height and length, and thus (i) an angle formed by an abutting surface of the storage battery 10 and the first guide 142 when one end of the storage battery 10 comes into contact with a specified surface (referred to as the abutting surface in some cases) of the first guide 142 is also different from (ii) an angle formed by an abutting surface of the storage battery 10 and the second guide 144 when one end of the storage battery 10 comes into contact with a specified surface (referred to as the abutting surface in some cases) of the second guide 144. For this reason, (i) a path of movement of the storage battery 10 moving from the contact with the first guide 142 until being housed at a predetermined position of the first housing part 122 is also different from (ii) a path of movement of the storage battery 10 moving from the contact with the second guide 144 until being housed at a predetermined position of the second housing part 124. In this way, the first guide 142 and the second guide 144 can assist the insertion of the storage battery 10 in different manners.

For example, the posture of the user may be different between a case where the user of the storage battery 10 inserts the storage battery 10 into the first housing part 122 and a case where the user inserts the storage battery 10 into the second housing part 124. On the other hand, when the shape of the first housing part 122 and the second housing part 124 and the position, the shape, and the like of the first opening 132 and the second opening 134 are designed in accordance with the posture of the user, a manufacturing cost of the housing device 100 may increase, and a dead space of the housing device 100 may increase.

On the other hand, according to this embodiment, the first guide 142 and the second guide 144 assist the insertion of the storage battery 10 in different respective manners. For example, the first guide 142 and the second guide 144 assist the operation of the user inserting the storage battery 10 into the first housing part 122 and the second housing part 124 in manners corresponding to respective heights of the first housing part 122 and the second housing part 124. Accordingly, the user can insert the storage battery 10 into the first housing part 122 or the second housing part 124 in a relatively comfortable posture. As a result, the physical burden of the user can be reduced.

Figure 2:
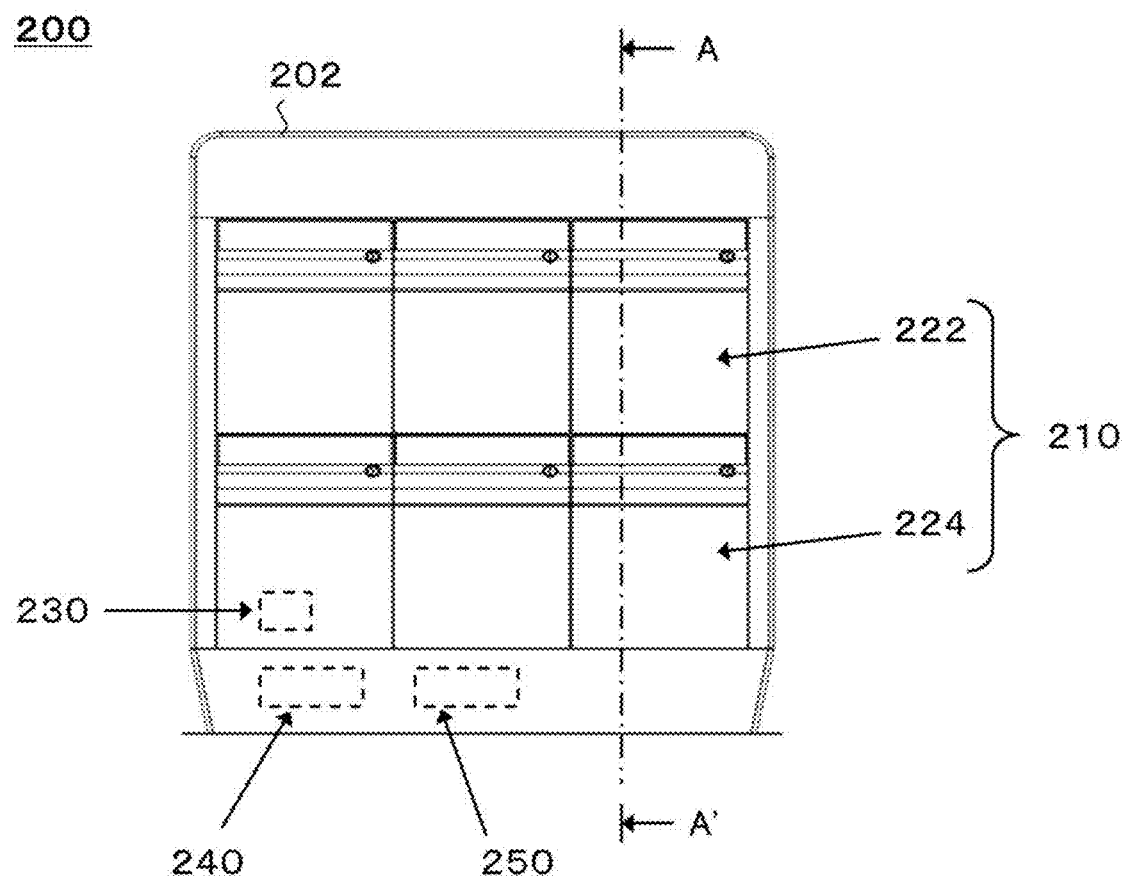
FIG. 2 schematically illustrates one example of a battery station 200.
Figure 3:
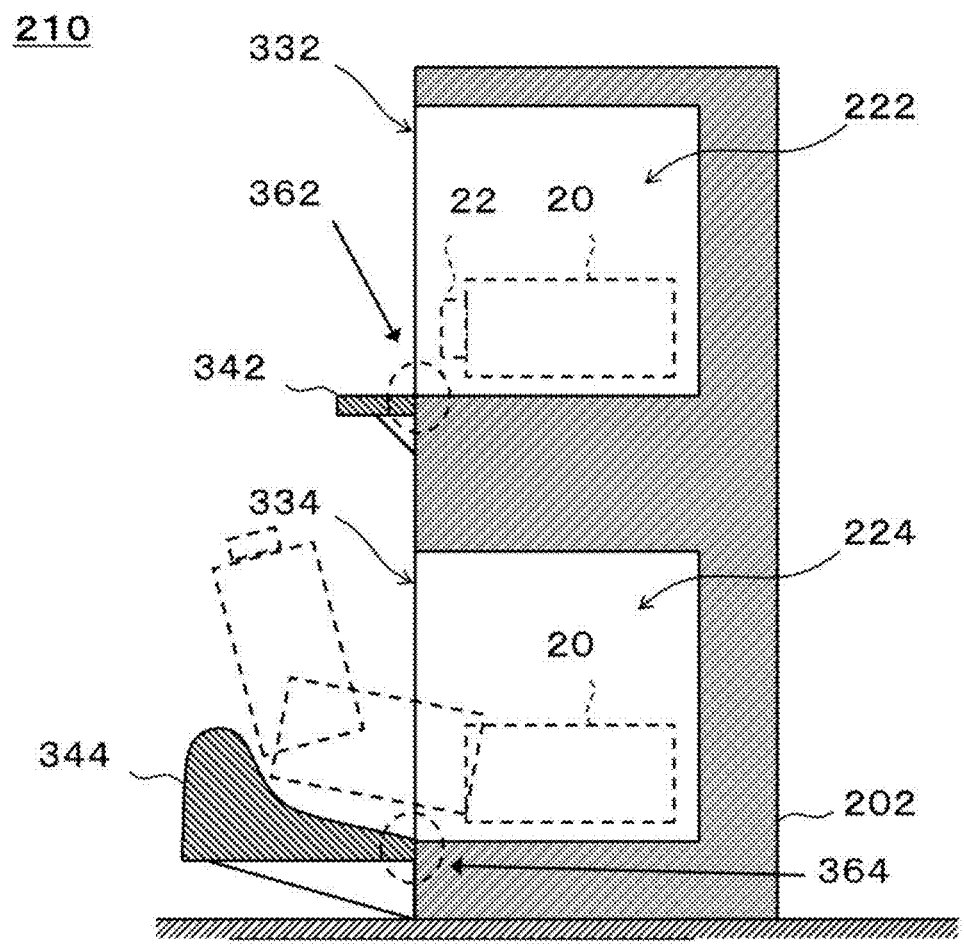
FIG. 3 schematically illustrates one example of a housing box 210.

One example of a battery station 200 is described by using FIGS. 2 and 3. FIG. 2 schematically illustrates one example of the battery station 200. As illustrated in FIG. 2, in this embodiment, for example, the battery station 200 includes a casing 202 and one or more housing boxes 210 arranged in the casing 202. The battery station 200 may include one or more housing boxes 210 arranged at different heights. For example, the battery station 200 includes one or more housing boxes 222 arranged on an upper stage and one or more housing boxes 224 arranged on a lower stage. The battery station 200 may also include a sensor 230, a charging device 240, and a control device 250. The battery station 200 may also include three or more housing boxes installed at different heights.

The battery station 200 may be one example of the housing device. One of a housing box 222 and a housing box 224 may be one example of one of the first housing part and the second housing part. The other of the housing box 222 and the housing box 224 may be one example of the other of the first housing part and the second housing part. The charging device 240 may be one example of a charging part.

In this embodiment, each of one or more housing boxes 210 houses a mobile battery 20. A space for housing the mobile battery 20 is formed inside each of one or more housing boxes 210. Each of one or more housing boxes 210 may house a single mobile battery 20 in the space or may house a plurality of mobile batteries 20. The mobile battery 20 may be one example of the storage battery.

The type of the mobile battery 20 is not limited particularly. The mobile battery 20 may be any type of secondary battery. The mobile battery 20 may be a portable storage battery. The size and the mass of the mobile battery 20 are not limited particularly. The mobile battery 20 may be 1 kg or more, 3 kg or more, 5 kg or more, or 10 kg or more. The mobile battery 20 may include a handle 22 for the user gripping the mobile battery 20 on at least one surface.

In this embodiment, the sensor 230 measures various kinds of physical quantities regarding at least one of the battery station 200 and the mobile battery 20. The sensor 230 obtains information indicating a state of at least one of the battery station 200 and the mobile battery 20. For example, the sensor 230 detects opening and closing of a lid or a door with respect to at least one of one or more housing boxes 210. The sensor 230 may detect the insertion of the mobile battery 20 into at least one of one or more housing boxes 210.

In this embodiment, the charging device 240 charges one or more respective mobile batteries 20 housed in one or more housing boxes 210. In this embodiment, the control device 250 controls the battery station 200. In one embodiment, the control device 250 manages the state of the battery station 200. For example, the control device 250 obtains the measurement data of the sensor 230. In another embodiment, the control device 250 controls the operation of the battery station 200. For example, the control device 250 controls opening and closing of the lids or the doors of one or more housing boxes 210. The control device 250 may control the charging device 240.

[Specific Configuration of Each Part of Control Device 250]

Each part of the control device 250 may be realized by hardware, realized by software, or realized by the hardware and the software. In each part of the control device 250, at least a part thereof may be realized by a single server or realized by a plurality of servers. In each part of the control device 250, at least a part thereof may be realized on a virtual server or a cloud system. In each part of the control device 250, at least a part thereof may be realized by a personal computer or a portable terminal. Examples of the portable terminal may include a mobile phone, a smartphone, a PDA, a tablet, a notebook computer or a laptop computer, a wearable computer, and the like. Each part of the control device 250 may use a distributed ledger technique such as a block chain or a distributed network to store information.

In a case where at least a part of the components configuring the control device 250 is realized by software, the components realized by the software may be realized by starting the software or the program defining an operation regarding the components in an information processor having a general configuration. The information processor having the general configuration may include (i) a data processor including a processor such as a CPU and a GPU, a ROM, a RAM, a communication interface, or the like (ii) an input device such as a keyboard, a pointing device, a touch panel, a camera, an audio input device, a gesture input device, various kinds of sensors, and a GPS receiver, (iii) an output device such as a display device, an audio output device, and a vibration device, and (iv) a storage device (including an external storage device) such as a memory, a HDD, and an SSD.

In the information processor having the general configuration, the above-described data processor or storage device may store the above-described software or program. The software or program is executed by the processor to cause the information processor to execute the operation defined by the software or the program. The software or the program may be stored in a non-temporary computer readable recording medium. The software or the program may be a program which makes the computer to function as the control device 250 or a part thereof. The software or the program may be a program which makes the computer to execute an information processing in the control device 250 or a part thereof

[Embodiment with Guide Member Fixed]

FIG. 3 schematically illustrates one example of a housing box 210. FIG. 3 illustrates one example of a cross section A-A' of FIG. 2, for example. As illustrated in FIG. 3, in this embodiment, the opening 332 is formed in a part of the housing box 222. The opening 332 may have a size available for carrying in or out the mobile battery 20. In addition, a guide member 342 is arranged on a peripheral part 362 of the opening 332 or in the vicinity of the peripheral part 362. In this embodiment, the opening 334 is formed in a part of the housing box 224. The opening 334 may have a size available for carrying in or out the mobile battery 20. In addition, a guide member 344 is arranged on a peripheral part 364 of the opening 334 or in the vicinity of the peripheral part 364.

One of the guide member 342 and the guide member 344 may be one example of the first guide. The other of the guide member 342 and the guide member 344 may be one example of the second guide. The peripheral part 362 may be one example of the first guide or the second guide. The peripheral part 364 may be one example of the first guide or the second guide.

In one embodiment, in a case where the guide member 342 is not arranged on the peripheral part 362 or in the vicinity of the peripheral part 362, one of the peripheral part 362 and the guide member 344 may be one example of the first guide, and the other of the peripheral part 362 and the guide member 344 may be one example of the first guide. In another embodiment, in a case where the guide member 344 is not arranged on the peripheral part 364 or in the vicinity of the peripheral part 364, one of the peripheral part 364 and the guide member 342 may be one example of the first guide, and the other of the peripheral part 364 and the guide member 342 may be one example of the first guide.

In this embodiment, the guide member 342 is used to assist the insertion of the mobile battery 20 into the housing box 222. For example, when the user inserts the mobile battery 20 into the housing box 222, the guide member 342 supports a part of the mobile battery 20. In this embodiment, the guide member 342 is connected to the peripheral part 362 or the vicinity thereof. For example, the guide member 342 is fixed to the peripheral part 362.

In this embodiment, the guide member 344 is used to assist the insertion of the mobile battery 20 into the housing box 224. For example, when the user inserts the mobile battery 20 into the housing box 224, the guide member 344 supports a part of the mobile battery 20. In this embodiment, the guide member 344 is connected to the peripheral part 364 or the vicinity thereof. For example, the guide member 344 is fixed to the peripheral part 364.

In this embodiment, the guide member 342 and the guide member 344 are different in size and shape. For this reason, the path of movement of the mobile battery 20 when the mobile battery 20 is inserted into the housing box 222 is different from the path of movement of the mobile battery 20 when the mobile battery 20 is inserted into the housing box 224.

As described above, the guide member 342 and the guide member 344 assist the insertion of the mobile battery 20 in different respective manners. Accordingly, the user can insert the mobile battery 20 into the housing box 222 or the housing box 224 in a relatively comfortable posture. As a result, the physical burden of the user can be reduced.

In this embodiment, the description has been given about a case where the guide member 342 is fixed to the peripheral part 362 or the vicinity thereof. However, the guide member 342 is not limited to this embodiment. In another embodiment, at least a part of the guide member 342 is translationally arranged on the peripheral part 362 or in the vicinity thereof. For example, the guide member 342 slides along the inner surface of the housing box 222. In still another embodiment, at least a part of the guide member 342 is rotatably arranged on the peripheral part 362 or in the vicinity thereof. The guide member 342 may rotate about a certain rotational axis.

In this embodiment, the description has been given about a case where the guide member 344 is fixed to the peripheral part 364 or the vicinity thereof. However, the guide member 344 is not limited to this embodiment. In another embodiment, at least a part of the guide member 344 is translationally arranged on the peripheral part 364 or in the vicinity thereof. For example, the guide member 344 slides along the inner surface of the housing box 224. In still another embodiment, at least a part of the guide member 344, is rotatably arranged on the peripheral part 364 or in the vicinity thereof. The guide member 344 may rotate about a certain rotational axis.

In this embodiment, the description has been given about a case where the guide member 342 is arranged on the peripheral part 362. However, the battery station 200 is not limited to this embodiment. In another embodiment, the battery station 200 may not include the guide member 342. In this case, the peripheral part 362 may be used to assist the insertion of the mobile battery 20 into the housing box 222. For example, when the user inserts the mobile battery 20 into the housing box 222, the peripheral part 362 supports a part of the mobile battery 20.

In this embodiment, the description has been given about a case where the guide member 344 is arranged on the peripheral part 364. However, the battery station 200 is not limited to this embodiment. In another embodiment, the battery station 200 may not include the guide member 344. In this case, the peripheral part 364 may be used to assist the insertion of the mobile battery 20 into the housing box 224. For example, when the user inserts the mobile battery 20 into the housing box 224, the peripheral part 364 supports a part of the mobile battery 20.

In this embodiment, the description has been given about a case where the guide member 342 and the guide member 344 are different in size and shape, and the guide member 342 and the guide member 344 assist the insertion of the storage battery in the different manners. However, the guide member 342 and the guide member 344 are not limited to this embodiment. In another embodiment, the guide member 342 and the guide member 344 may be different in one of size and shape.

In this embodiment, the details of the guide member 342 and the guide member 344 are determined to be different in at least one of (i) a shape of the guide, (ii) a dimension of the guide, and (iii) a manner in which the guide holds the mobile battery 20, and (iv) a path of movement of the mobile battery 20 assisted by the guide. The details of the guide member 342 and the guide member 344 may be determined to be different in at least one of (i) a dimension of an area for assisting the insertion of the mobile battery 20, (ii) a shape of a surface abutting on the mobile battery 20, (iii) a shape of a guide groove provided in the guide, and (iv) a dimension of the guide groove provided in the guide.

According to one embodiment, the shape and the dimension of the guide member 342 and the guide member 344 are determined such that the path of movement of the mobile battery 20 assisted by the guide member 342 is different from the path of movement of the mobile battery 20 assisted by the guide member 344. According to another embodiment, at least one of a shape, a dimension, and an installation position of a holding member holding the mobile battery 20 is determined such that the path of movement of the mobile battery 20 assisted by the guide member 342 is different from the path of movement of the mobile battery 20 assisted by the guide member 344.

[Embodiment with Guide Member Arranged Rotatably]

Figure 4:
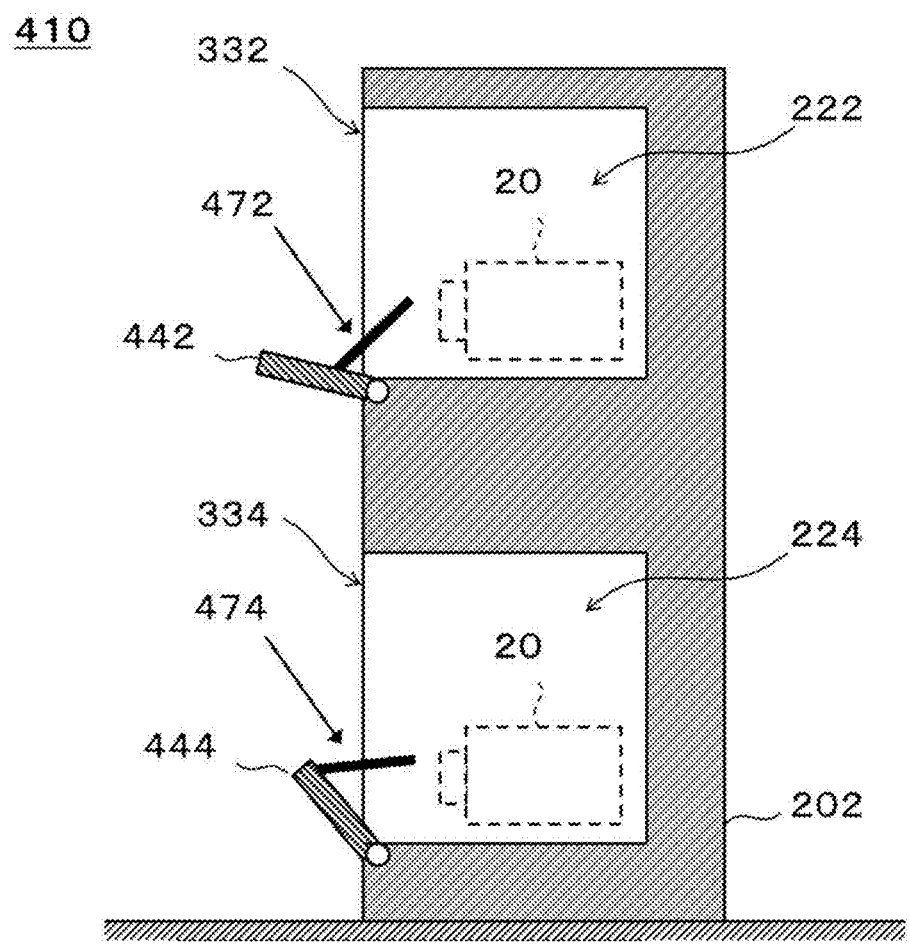
FIG. 4 schematically illustrates one example of a housing box 410.
Figure 5:
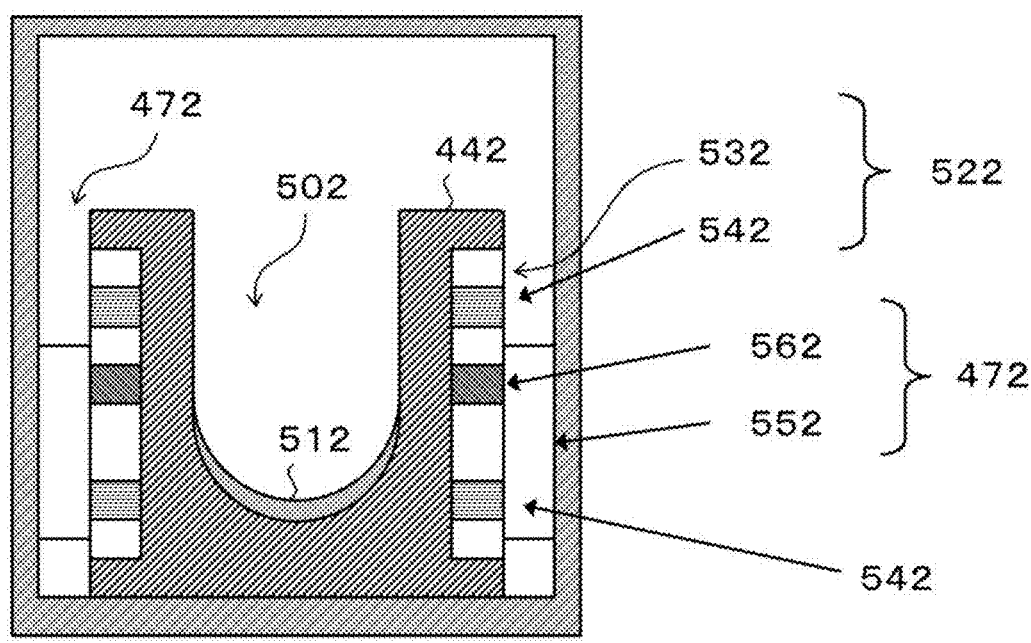
FIG. 5 schematically illustrates one example of a guide member 442 and an opening adjusting part 472.
Figure 6:
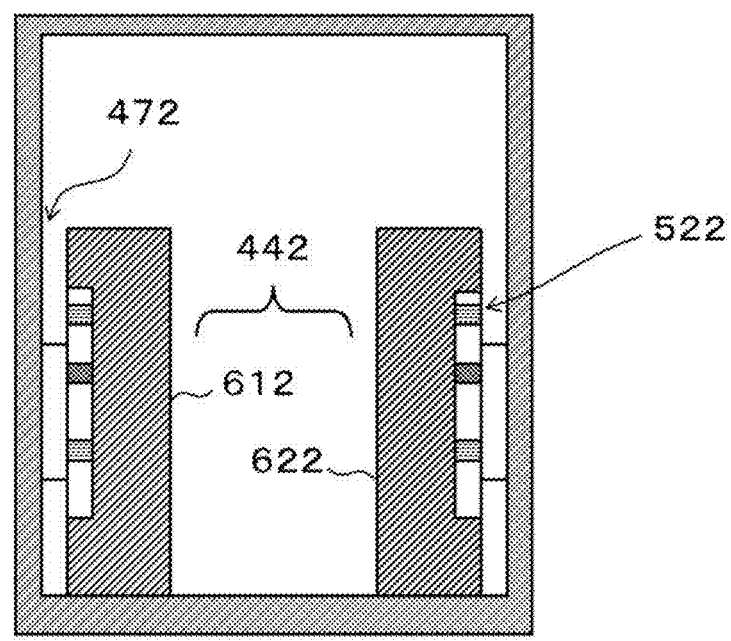
FIG. 6 schematically illustrates another example of the guide member 442 and the opening adjusting part 472.

A housing box 410 is described by using FIGS. 4 to 6. FIG. 4 schematically illustrates one example of the housing box 410. In this embodiment, the housing box 410 includes a guide member 442, an opening adjusting part 472, a guide member 444, and an opening adjusting part 474.

One of the guide member 442 and the guide member 444 may be one example of the first guide. The other of the guide member 442 and the guide member 444 may be one example of the second guide. One of the opening adjusting part 472 and the opening adjusting part 474 may be one example of a first rotation amount adjusting part. The other of the opening adjusting part 472 and the opening adjusting part 474 may be one example of a second rotation amount adjusting part.

In this embodiment, the guide member 442 is different from the guide member 342 in that at least a part is rotatably arranged on the peripheral part 362 or in the vicinity thereof. In this embodiment, the guide member 442 rotates about a rotational axis perpendicular to a vertical direction or a height direction (the vertical direction in the drawings) of the battery station 200 For example, the guide member 442 rotates from the inside of the housing box 222 toward the outside before the mobile battery 20 is inserted into the housing box 222. Accordingly, the guide member 442 can assist the insertion of the mobile battery 20 into the housing box 222. On the other hand, the guide member 442 may rotate from the outside of the housing box 222 toward the inside after the mobile battery 20 is inserted into the housing box 222. The guide member 442 may have a configuration similar with the guide member 342 except the above-described difference.

In this embodiment, the guide member 444 is different from the guide member 344 in that at least a part is rotatably arranged on the peripheral part 364 or in the vicinity thereof. In this embodiment, the guide member 444 rotates about the rotational axis perpendicular to the vertical direction or the height direction (the vertical direction in the drawings) of the battery station 200. For example, the guide member 444 rotates from the inside of the housing box 224 toward the outside before the mobile battery 20 is inserted into the housing box 224. Accordingly, the guide member 444 can assist the insertion of the mobile battery 20 into the housing box 224. On the other hand, the guide member 444 may rotate from the outside of the housing box 224 to the inside after the mobile battery 20 is inserted into the housing box 224. The guide member 442 may have a configuration similar with the guide member 344 except the above-described difference.

In one embodiment, the guide member 442 and the guide member 444 may have substantially the same shape and dimension. For example, in a case where the guide member 442 and the guide member 444 have no difference in the shape and the dimension of the place affected by the path of movement of the mobile battery 20 except manufacturing errors, errors due to wear and tear, and the like, it may be determined that the guide member 442 and the guide member 444 are substantially the same in shape and dimension. In another embodiment, the guide member 442 and the guide member 444 may be different in at least one of shape and dimension.

In one embodiment, the guide member 442 and the guide member 444 are rotated by a power source such as electricity and compressed air. For example, the guide member 442 and the guide member 444 may be rotated by using a power source such as an actuator or a motor. For example, in a case where the sensor 230 detects that the housing process of the mobile battery 20 starts, the control device 250 controls the above-described power source to rotate the guide member 442 and the guide member 444 to certain positions. The certain positions may be predetermined positions. In another embodiment, the guide member 442 and the guide member 444 may be rotated by using a rotating force generated by opening and closing the lid or the door provided in the opening 332 and the opening 334. For example, the guide member 442 and the guide member 444 may be rotated by using a mechanical mechanism of converting the above-described rotating force into a driving force. A power transmission mechanism and a differential drive mechanism can be exemplified as the mechanical mechanism.

In this embodiment, the opening adjusting part 472 adjusts the rotation amount of the guide member 442. For example, the opening adjusting part 472 limits the rotatable range of the guide member 442. Accordingly, when the user inserts the mobile battery 20 into the housing box 222, the guide member 442 is arranged at a predetermined position (or in a predetermined posture). In this embodiment, the opening adjusting part 474 adjusts the rotation amount of the guide member 444. For example, the opening adjusting part 474 limits the rotatable range of the guide member 444. Accordingly, when the user inserts the mobile battery 20 into the housing box 224, the guide member 444 is arranged at a predetermined position (or in a predetermined posture).

At least one of the opening adjusting part 472 and the opening adjusting part 474 may adjust the rotation amount of the corresponding guide member such that the guide member 442 and the guide member 444 are different in rotation amount. For example, the rotation amount of the guide member can be adjusted by adjusting (i) an attachment position of the opening adjusting part in the guide member and/or the housing box, (ii) a size or a type of the opening adjusting part, (iii) setting of the opening adjusting part, (iv) a control amount of the opening adjusting part by the control device 250, and the like. At least one of the opening adjusting part 472 and the opening adjusting part 474 may adjust the rotation amount of the corresponding guide member such that the posture of the guide member 442 in a guide position is different from the posture of the guide member 444 in the guide position. For example, the rotation amount of each guide member is determined according to the installation height of each guide member. For example, the rotation amount of the guide member (for example, a guide member having a flat abutting surface) increases as the installation height of the guide member increases (that is, the posture of the guide member in the guide position becomes horizontal). For example, the rotation amount of each guide member may be determined according to at least one of the shape and the size of each guide member and the installation height of each guide.

In this embodiment, the guide member 442 and the guide member 444 are different in rotation amount. For this reason, for example, the posture of the guide member 442 in the guide position is different from the posture of the guide member 442 in the guide position. As a result, the path of movement of the mobile battery 20 when the mobile battery 20 is inserted into the housing box 222 is different from the path of movement of the mobile battery 20 when the mobile battery 20 is inserted into the housing box 224.

As described above, the guide member 442 and the guide member 444 assist the insertion of the mobile battery 20 in different respective manners. Accordingly, the user can insert the mobile battery 20 into the housing box 222 or the housing box 224 in a relatively comfortable posture. As a result, the physical burden of the user can be reduced.

The opening adjusting part 472 and the opening adjusting part 474 may have substantially the same shape and dimension. For example, in a case where the difference in the shape and the dimension of the opening adjusting part 472 and the opening adjusting part 474 can be said merely as manufacturing errors or errors due to wear and tear, it may be determined that the opening adjusting part 472 and the opening adjusting part 474 may be substantially the same in shape and dimension. In another embodiment, the guide member 442 and the guide member 444 may be different in at least one of shape and dimension. The attachment position of the opening adjusting part 472 in the housing box 222 and the attachment position of the opening adjusting part 474 in the housing box 224 may be substantially the same or different. In a case where the difference between both can be said merely as manufacturing errors or errors due to wear and tear, it may be determined that both are substantially the same.

FIG. 5 schematically illustrates one example of the guide member 442 and the opening adjusting part 472. In this embodiment, the guide member 442 includes a recess part 502 and a protection part 512. In the end portions of the guide member 442, the recess part 502 has a shape recessed from the end portion (referred to as an open end in some cases) on a side facing the end portion (referred to as a connection end in some cases) connected with the peripheral part 362 toward the connection end. For example, the dimension of the recess part 502 is determined such that a part of a hand or an arm of the user can enter the recess part. Accordingly, an operation of placing the mobile battery 20 on the guide member 442 is facilitated.

In this embodiment, the protection part 512 is arranged in the peripheral edge of the recess part 502. The protection part 512 may be arranged in the end portion of the recess part 502 on the connection end side. For example, the protection part 512 may be configured by (i) an elastic material such as a natural rubber and a synthetic rubber or (ii) a flexible material such as natural fiber, synthetic fiber, and nonwoven fabric. Accordingly, even if the hand of the user is caught between the mobile battery 20 and the guide member 442, the injury of the user can be suppressed.

As illustrated in FIG. 5, in this embodiment, the guide member 442 includes an opening degree limiting part 522. The opening degree limiting part 522 may include a recess part 532 and one or more limiting members 542. The opening degree limiting part 522 limits the opening degree of the guide member 442 by defining the maximum value of the opening degree of the guide member 442. The opening degree limiting part 522 may define the minimum value of the opening degree of the guide member 442. In this embodiment, the opening adjusting part 472 includes a link member 552 and a projection part 562 protruding from the link member 552. For example, the link member 552 is rotatably connected to the wall surface of the housing box 222. The guide member 444 and the opening adjusting part 474 may have configurations similar with those of the guide member 442 and the opening adjusting part 472.

In this embodiment, the recess part 532 is formed in an end surface which connects the open end and the connection end of the guide member 442. One or more limiting members 542 and the projection part 562 of the opening adjusting part 472 are arranged inside the recess part 532. One or more limiting members 542 limit the movement of the projection part 562 inside the recess part 532. The maximum value of the opening degree of the guide member 442 can be adjusted by adjusting the position of the limiting member 542 in the recess part 532. The above-described maximum value may be changed by a command or an operation of the user or a manager. The above-described maximum value may be changed manually or may be changed automatically by the control device 250.

FIG. 6 schematically illustrates another example of the guide member 442 and the opening adjusting part 472. The guide member 442 in the embodiment of FIG. 6 is different from the guide member 442 in the embodiment of FIG. 5 in that the guide member 442 includes a guide member 612 and a guide member 622. The opening adjusting part 472 in the embodiment of FIG. 6 is different from the opening adjusting part 472 in the embodiment of FIG. 5 in that one of two opening adjusting parts 472 is connected to the guide member 612, and the other of two opening adjusting parts 472 is connected to the guide member 622.

Figure 7:
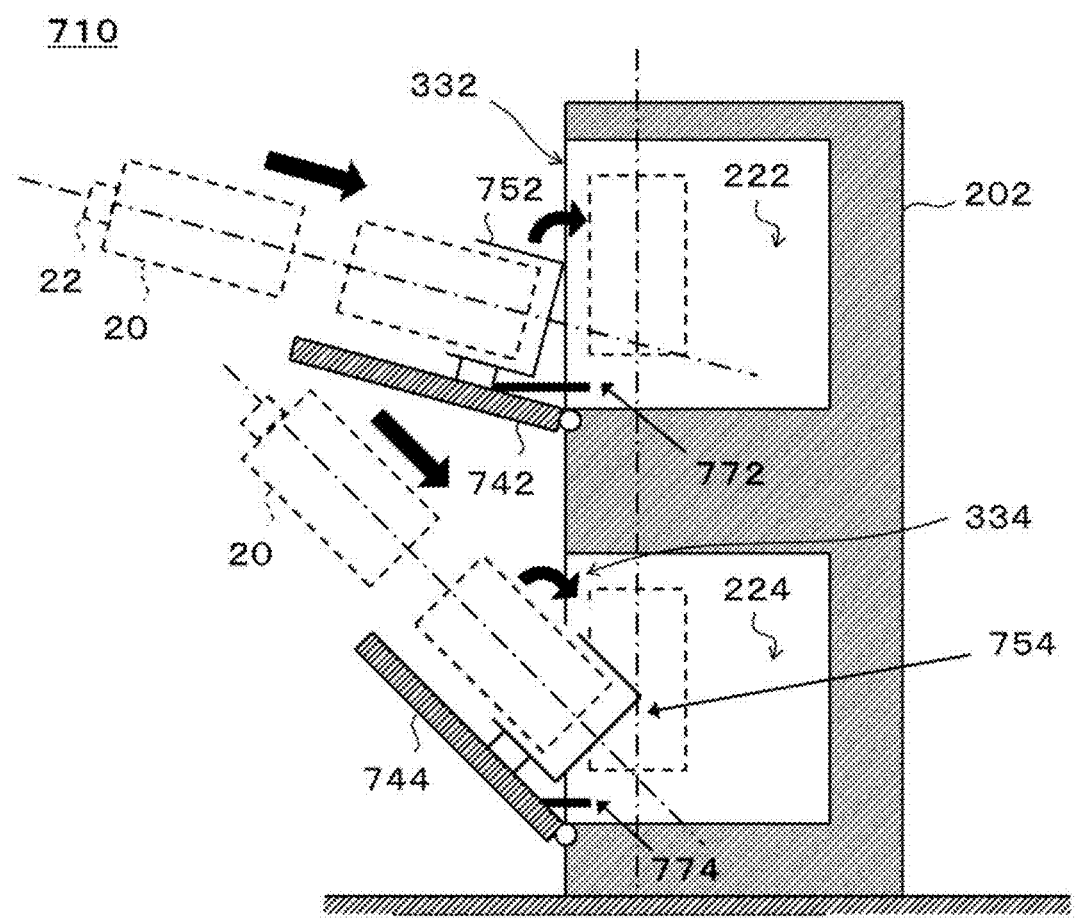
FIG. 7 schematically illustrates one example of a housing box 710.

FIG. 7 schematically illustrates one example of a housing box 710. In this embodiment, the housing box 710 includes a lid 742, a battery holder 752, and an opening adjusting part 772. In addition, the housing box 710 includes a lid 744, a battery holder 754, and an opening adjusting part 774. The opening adjusting part 772 may have a configuration similar with that of the opening adjusting part 472. The opening adjusting part 774 may have a configuration similar with that of the opening adjusting part 474.

One of the lid 742 and the lid 744 may be one example of the first lid part and the first guide. The other of the lid 742 and the lid 744 may be one example of a second lid part and the first guide. One of the battery holder 752 and the battery holder 754 may be one example of the first guide. The other of the battery holder 752 and the battery holder 754 may be one example of the second guide.

In this embodiment, the lid 742 is configured to be capable of opening and closing the opening 332 of the housing box 222. In this embodiment, in the lid 742, one end portion is connected rotatably to the peripheral part 362 by a hinge or the like. A manner of opening and closing the lid 742 is not limited particularly. The lid 742 may be opened and closed in a longitudinal direction (a right and left direction in the drawings) and may be opened and closed in a horizontal direction. The manner of opening and closing the lid 742 may be a biparting type. In this embodiment, the lid 742 includes the battery holder 752 on the inner surface. The lid 742 may have a configuration similar with that of the guide member 442 except the above-described point.

In this embodiment, the lid 744 is configured to be capable of opening and closing the opening 334 of the housing box 224. In this embodiment, in the lid 744, one end portion is connected rotatably to the peripheral part 364 by a hinge or the like. A manner of opening and closing the lid 744 is not limited particularly. The lid 744 may be opened and closed in the longitudinal direction (the right and left direction in the drawings) or may be opened and closed in the horizontal direction. The manner of opening and closing the lid 744 may be a biparting type. In this embodiment, the lid 744 includes the battery holder 754 on the inner surface. The lid 744 may have a configuration similar with that of the guide member 444 except the above-described point.

In this embodiment, the battery holder 752 holds the mobile battery 20. The battery holder 752 may define a relative position of the lid 742 and the mobile battery 20 held by the battery holder 752. In this embodiment, the battery holder 754 holds the mobile battery 20. The battery holder 754 may define a relative position of the lid 744 and the mobile battery 20 held by the battery holder 754. The dimensions of the battery holder 752 ad the battery holder 754 may be different or may be substantially the same. The shapes of the inner surfaces of the battery holder 752 and the battery holder 754 may be different or may be substantially the same.

Even in this embodiment, similarly with the embodiment described with reference to FIGS. 4 to 6, for example, at least one of the opening adjusting part 772 and the opening adjusting part 774 adjusts the rotation amount of the corresponding lid such that the lid 742 and the lid 744 are different in rotation amount. For this reason, for example, the posture of the lid 742 in the guide position is different from the posture of the lid 744 in the guide position. As a result, the path of movement of the mobile battery 20 when the mobile battery 20 is inserted into the housing box 222 is different from the path of movement of the mobile battery 20 when the mobile battery 20 is inserted into the housing box 224.

As described above, the lid 742 and the lid 744 and the battery holder 752 and the battery holder 754 attached to the respective lids assist the insertion of the mobile battery 20 in different respective manners. Accordingly, the user can insert the mobile battery 20 into the housing box 222 or the housing box 224 in a relatively comfortable posture. As a result, the physical burden of the user can be reduced.

[Embodiment with Guide Member Arranged Translationally]

Figure 8:
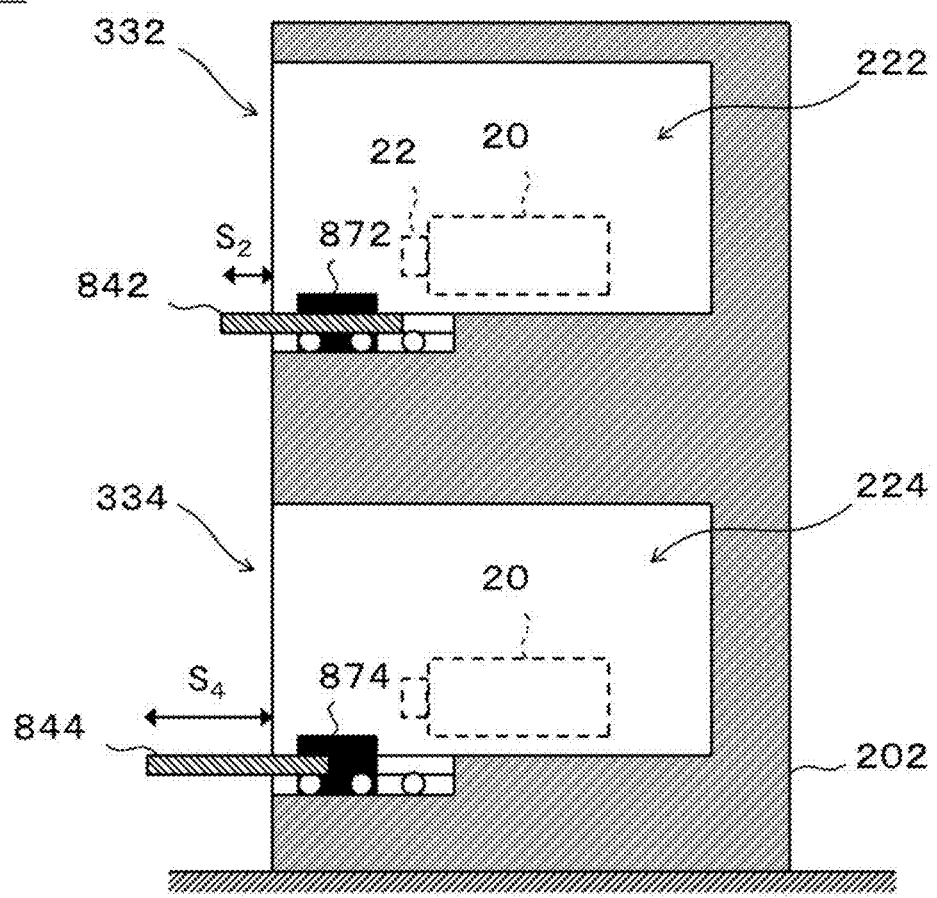
FIG. 8 schematically illustrates one example of a housing box 810.
Figure 9:
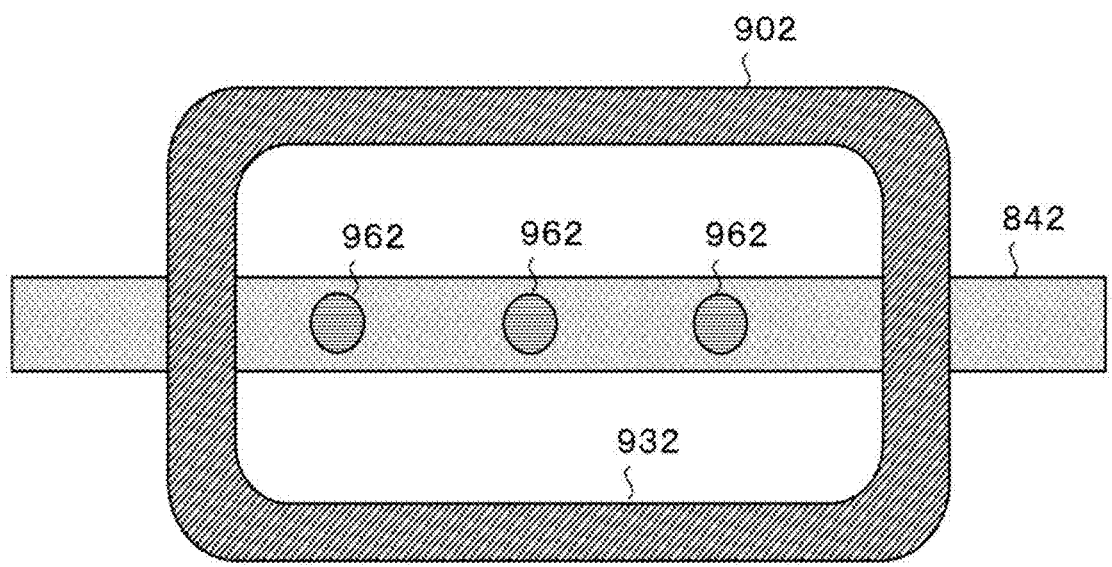
FIG. 9 schematically illustrates one example of a guide member 842 and a slide amount adjusting part 872.

A housing box 810 is described by using FIGS. 8 and 9. FIG. 8 schematically illustrates one example of the housing box 810. As illustrated in FIG. 8, in this embodiment, the housing box 810 includes a guide member 842 and a slide amount adjusting part 872. In addition, the housing box 810 may also include a guide member 844 and a slide amount adjusting part 874.

One of the guide member 842 and the guide member 844 may be one example of the first guide. The other of the guide member 842 and the guide member 844 may be one example of the second guide. One of the slide amount adjusting part 872 and the slide amount adjusting part 874 may be one example of a first movement amount adjusting part. The other of the slide amount adjusting part 872 and the slide amount adjusting part 874 may be one example of a second movement amount adjusting part.

In this embodiment, the guide member 842 is different from the guide member 342 in that at least a part is arranged translationally in the peripheral part 362 or the vicinity thereof. For example, the guide member 842 may slide along the inner surface of the housing box 222 by using a sliding mechanism. For example, before the mobile battery 20 is inserted into the housing box 222, the guide member 842 moves from the inside of the housing box 222 to the outside while at least a part slides along the bottom surface of the housing box 222 and. On the other hand, after the mobile battery 20 is inserted into the housing box 222, the guide member 842 moves from the outside of the housing box 222 to inside while at least a part slides along the bottom surface of the housing box 222. The guide member 842 may have a configuration similar with that of the guide member 342 except the above-described difference.

In this embodiment, the guide member 844 is different from the guide member 344 in that at least a part is arranged translationally in the peripheral part 364 or the vicinity thereof. For example, the guide member 844 may slide along the inner surface of the housing box 224 by using a sliding mechanism. For example, before the mobile battery 20 is inserted into the housing box 224, the guide member 844 moves from the inside of the housing box 224 to the outside while at least a part slides along the bottom surface of the housing box 224. On the other hand, after the mobile battery 20 is inserted into the housing box 224, the guide member 844 moves from the outside of the housing box 224 to the inside while at least a part slides along the bottom surface of the housing box 224. The guide member 844 may have a configuration similar with that of the guide member 344 except the above-described difference.

In one embodiment, the guide member 842 and the guide member 844 may have substantially the same shape and dimension. For example, in a case where the guide member 842 and the guide member 844 have no difference in the shape and the dimension of the place affected by the path of movement of the mobile battery 20 except manufacturing errors, errors due to wear and tear, and the like, it may be determined that the guide member 842 and the guide member 844 are substantially the same in shape and dimension. In another embodiment, the guide member 842 and the guide member 844 may be different in at least one of shape and dimension.

In one embodiment, the guide member 842 and the guide member 844 are moved or slid by a power source such as electricity and compressed air. For example, the guide member 842 and the guide member 844 may be moved or slid by using a power source such as an actuator or a motor. For example, in a case where the sensor 230 detects that the housing process of the mobile battery 20 starts, the control device 250 controls the power source to slide the guide member 842 and the guide member 844 to certain positions. The certain positions may be predetermined positions. In another embodiment, the guide member 842 and the guide member 844 may be moved or slid by using a rotating force generated by opening and closing the lid or the door provided in the opening 332 and the opening 334. For example, the guide member 842 and the guide member 844 may be moved or slid by using a mechanical mechanism of converting the above-described rotating force into a driving force. A power transmission mechanism and a differential drive mechanism can be exemplified as the mechanical mechanism.

In this embodiment, the slide amount adjusting part 872 adjusts a movement amount $S_2$ of the guide member 842. For example, the slide amount adjusting part 872 limits the slidable range of the guide member 842. Accordingly, when the user inserts the mobile battery 20 into the housing box 224, the guide member 842 is arranged at a predetermined position. In this embodiment, the slide amount adjusting part 874 adjusts a movement amount $S_4$ of the guide member 844. For example, the slide amount adjusting part 874 limits the slidable range of the guide member 844. Accordingly, when the user inserts the mobile battery 20 into the housing box 224, the guide member 844 is arranged in a predetermined position.

At least one of the slide amount adjusting part 872 and the slide amount adjusting part 874 may adjust the movement amount of the corresponding guide such that the guide member 842 and the guide member 844 are different in movement amount. For example, the movement amount of the guide member can be adjusted by adjusting (i) the attachment position of the slide amount adjusting part in the guide member and/or the housing box, (ii) the size or the type of the slide amount adjusting part, (iii) the setting of the slide amount adjusting part, (iv) the control amount of the slide amount adjusting part by the control device 250, and the like. At least one of the slide amount adjusting part 872 and the slide amount adjusting part 874 may adjust the movement amount of the corresponding guide such that the dimension of the area of the guide member 842 capable of being used to assist the insertion of the mobile battery 20 is different from the dimension of the area of the guide member 844 capable of being used to assist the insertion of the mobile battery 20. For example, the movement amount of each guide member is determined according to the installation height of each guide member. For example, the movement amount of the guide member decreases as the installation height of the guide member increases. For example, the movement amount of each guide may be determined according to at least one of the shape and the size of each guide and the installation height of each guide.

In this embodiment, the guide member 842 and the guide member 844 are different in movement amount. For this reason, for example, the dimension (for example, a length or an area) of the area of the guide member 842 capable of being used to assist the insertion of the mobile battery 20 in a case where the guide member 842 slides to the guide position is different from the dimension of the area of the guide member 844 capable of being used to assist the insertion of the mobile battery 20 in a case where the guide member 844 slides to the guide position. As a result, the path of movement of the mobile battery 20 when the mobile battery 20 is inserted into the housing box 222 is different from the path of movement of the mobile battery 20 when the mobile battery 20 is inserted into the housing box 224.

As described above, the guide member 842 and the guide member 844 assist the insertion of the mobile battery 20 in different respective manners. Accordingly, the user can insert the mobile battery 20 into the housing box 222 or the housing box 224 in a relatively comfortable posture. As a result, the physical burden of the user can be reduced.

The slide amount adjusting part 872 and the slide amount adjusting part 874 may have substantially the same shape and dimension. For example, in a case where the difference in the shape and the dimension of the slide amount adjusting part 872 and the slide amount adjusting part 874 can be said merely as manufacturing errors or errors due to wear and tear, it may be determined that the slide amount adjusting part 872 and the slide amount adjusting part 874 may be substantially the same in shape and dimension. In another embodiment, the slide amount adjusting part 872 and the slide amount adjusting part 874 may be different in at least one of shape and dimension. The attachment position of the slide amount adjusting part 872 in the housing box 222 and the attachment position of the slide amount adjusting part 874 in the housing box 224 may be substantially the same or different. In a case where the difference between both can be said merely as manufacturing errors or errors due to wear and tear, it may be determined that both are substantially the same.

FIG. 9 schematically illustrates one example of the guide member 842 and the slide amount adjusting part 872. In this embodiment, the slide amount adjusting part 872 limits the slide amount of the slide amount adjusting part 872 by defining the maximum value of the slide amount of the guide member 842. The slide amount adjusting part 872 may define the minimum value of the slide amount of the guide member 842. The guide member 844 and the slide amount adjusting part 874 may have configurations similar with those of the guide member 842 and the slide amount adjusting part 872.

In this embodiment, the opening 932 is formed in a main body 902 of the slide amount adjusting part 872. In addition, the guide member 842 includes one or more projection parts 962. Further, one or more projection parts 962 of the guide member 842 move inside the opening 932. The maximum value of the slide amount of the guide member 842 can be adjusted by adjusting the position of the projection part 962 in the guide member 842. The above-described maximum value may be changed by a command or an operation of the user or a manager. The above-described maximum value may be changed manually or may be changed automatically by the control device 250.

[Embodiment with Different Holding Manner]

Figure 10:
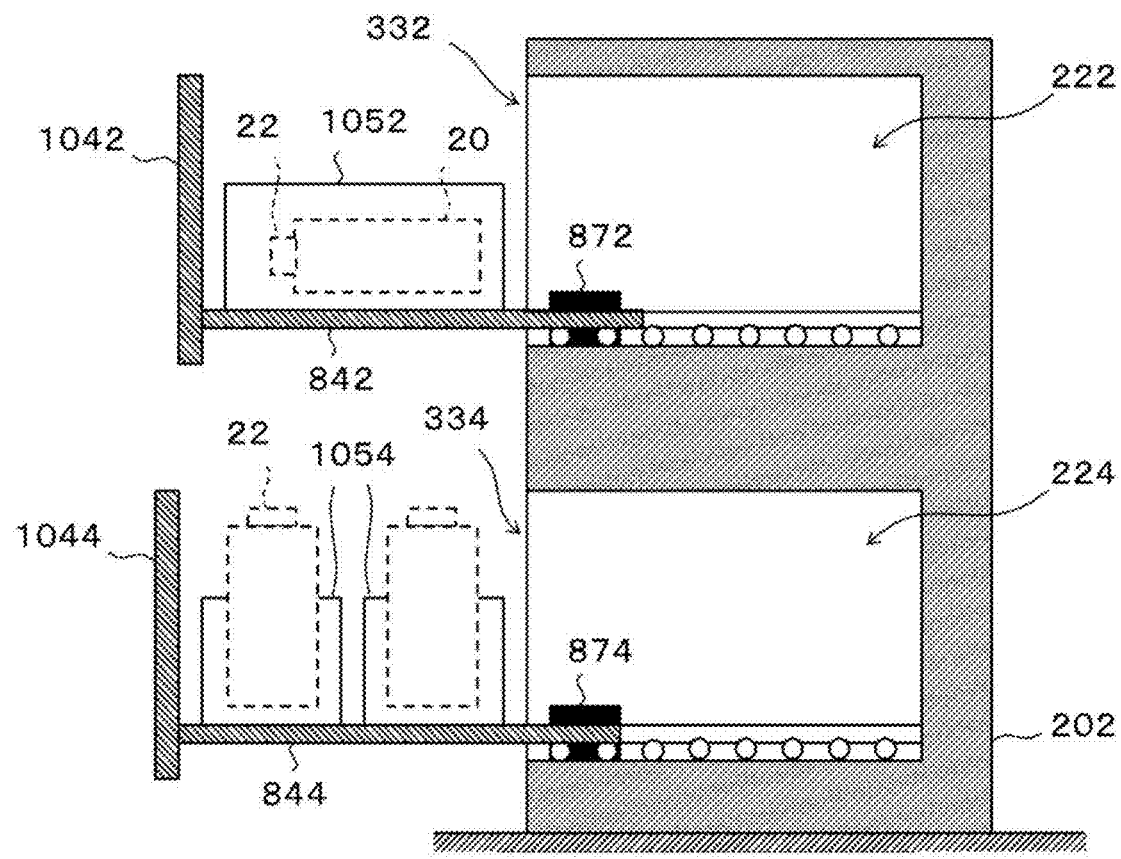
FIG. 10 schematically illustrates one example of a housing box 1010.

FIG. 10 schematically illustrates one example of a housing box 1010. In this embodiment, the housing box 1010 includes a guide member 842, a slide amount adjusting part 872, a lid 1042, and a battery holder 1052. The housing box 1010 may also include the guide member 844, the slide amount adjusting part 874, the lid 1044, and a battery holder 1054.

One of the lid 1042 and the lid 1044 may be one example of the first lid part and the first guide. The other of the lid 1042 and the lid 1044 may be one example of the second lid part and the first guide. One of the battery holder 1052 and the battery holder 1054 may be one example of the first guide. The other of the battery holder 1052 and the battery holder 1054 may be one example of the second guide.

In this embodiment, the lid 1042 is configured to be capable of opening and closing the opening 332 of the housing box 222. The lid 1042 may be connected to one end of the guide member 842. A manner of opening and closing the lid 1042 is not limited to this embodiment. The lid 1042 may have a configuration similar with that of the lid 742. In this embodiment, the lid 1044 is configured to be capable of opening and closing the opening 334 of the housing box 224. The lid 1044 may be connected to one end of the guide member 844. A manner of opening and closing the lid 1044 is not limited to this embodiment. The lid 1044 may have a configuration similar with that of the lid 744.

In this embodiment, the battery holder 1052 is arranged on the guide member 842. The battery holder 1054 is arranged on the guide member 844. For example, two battery holders 1054 are arranged on the guide member 844. A plurality of battery holders 1052 may be arranged on the guide member 842, and a plurality of battery holders 1054 may be arranged on the guide member 844. The number of the battery holders 1052 may be same as or may be different from the number of the battery holders 1054. The battery holder 1052 and the battery holder 1054 may have the same configurations as those of the battery holder 752 and the battery holder 754, respectively.

In this embodiment, the battery holder 1052 and the battery holder 1054 hold the mobile battery 20 in different respective manners. For example, the battery holder 1052 holds the mobile battery 20 in a lateral direction. More specifically, the battery holder 1052 holds the mobile battery 20 such that the handle 22 becomes a side surface. On the other hand, the battery holder 1054 holds the mobile battery 20 in a vertical direction. More specifically, the battery holder 1054 holds the mobile battery 20 such that the handle 22 becomes an upper surface.

According to this embodiment, the battery holder 1052 and the battery holder 1054 assist the operation of the user inserting the storage battery 10 into the housing box 222 and the housing box 224 in the manners corresponding to respective heights of the housing box 222 and the housing box 224. Accordingly, the user can insert the mobile battery 20 into the housing box 222 or the housing box 224 in a relatively comfortable posture. As a result, the physical burden of the user can be reduced.

Hereinbefore, the invention has been described by using the embodiments. However, the technical range of the invention is not limited to the range described in the embodiments. It is apparent to those skilled in the art that various changes or improvements can be made in the embodiments. In addition, the items described in a specified embodiment may be applied to another embodiment within technically consistent ranges. It is apparent from the appended claims that the embodiment thus changed or improved can also be included in the technical range of the invention.

It should be noted that the processes such as the operations, procedures, steps, and stages in the device, system, program, and method shown in the claims, the specification, or the drawings can be performed in any order as long as the execution order is not indicated by "prior to", "before", or the like, and the output from a previous process is not used in a later process. Even if an operation flow in the claims, the specification, and the drawings is described with the use of "first", "next" and the like for convenience, it does not mean that the operation is necessarily to be implemented in that order.

EXPLANATION OF REFERENCES 10 storage battery
20 mobile battery
22 handle
100 housing device
122 first housing part
124 second housing part
132 first opening
134 second opening
142 first guide
144 second guide
162 peripheral part
164 peripheral part
200 battery station
202 casing
210 housing box
222 housing box
224 housing box
230 sensor
240 charging device
250 control device
332 opening
334 opening
342 guide member
344 guide member
362 peripheral part
364 peripheral part
410 housing box
442 guide member
444 guide member
472 opening adjusting part
474 opening adjusting part
502 recess part
512 protection part
522 opening degree limiting part
532 recess part
542 limiting member
552 link member
562 projection part
612 guide member
622 guide member
710 housing box
742 lid
744 lid
752 battery holder
754 battery holder
772 opening adjusting part
774 opening adjusting part
810 housing box
842 guide member
844 guide member
872 slide amount adjusting part
874 slide amount adjusting part
902 main body
932 opening
962 projection part
1010 housing box
1042 lid
1044 lid
1052 battery holder
1054 battery holder

What is claimed is:

1. A housing device comprising:
a first housing part arranged at a first height and a second housing part arranged at a second height, each housing part to house a storage battery; and
a first guide to assist insertion of the storage battery to the first housing part and a second guide to assist insertion of the storage battery to the second housing part, wherein
the first guide assists the insertion of the storage battery in a first manner corresponding to the first height and the second guide assists the insertion of the storage battery in a second manner corresponding to the second height.

2. The housing device according to claim 1, wherein
a first opening having a size available for carrying in or out the storage battery is formed in a part of the first housing part, and
a second opening having a size available for carrying in or out the storage battery is formed in a part of the second housing part.

3. The housing device according to claim 2, wherein
at least one of the first guide and the second guide has at least a part connected to a peripheral part of a corresponding opening of the first opening and the second opening.

4. The housing device according to claim 2, wherein
at least one of the first guide and the second guide has at least a part rotatably arranged on a peripheral part of a corresponding opening of the first opening and the second opening or in a vicinity of the peripheral part.

5. The housing device according to claim 4, wherein
the first guide has at least a part rotatably arranged on a peripheral part of the first opening or in a vicinity of the peripheral part,
the second guide has at least a part rotatably arranged on a peripheral part of the second opening or in a vicinity of the peripheral part,
the housing device further comprises:
a first rotation amount adjusting part which adjusts a rotation amount of the first guide; and
a second rotation amount adjusting part which adjusts a rotation amount of the second guide, and
at least one of the first rotation amount adjusting part and the second rotation amount adjusting part adjusts a rotation amount of a corresponding guide such that the first guide and the second guide are different in rotation amount.

6. The housing device according to claim 2, wherein
at least one of the first guide and the second guide has at least a part translationally arranged on a peripheral part of a corresponding opening of the first opening and the second opening or in a vicinity of the peripheral part.

7. The housing device according to claim 6, wherein
the first guide has at least a part translationally arranged on a peripheral part of the first opening or in a vicinity of the peripheral part,
the second guide has at least a part translationally arranged on a peripheral part of the second opening or in a vicinity of the peripheral part,
the housing device further comprises:
a first movement amount adjusting part which adjusts a movement amount of the first guide; and
a second movement amount adjusting part which adjusts a movement amount of the second guide, and at least one of the first movement amount adjusting part and the second movement amount adjusting part adjusts a movement amount of a corresponding guide such that the first guide and the second guide are different in movement amount.

8. The housing device according to claim 4, wherein the first guide and the second guide are substantially same in shape and size.

9. The housing device according to claim 2, further comprising:
   at least one of a first lid part configured to be capable of opening and closing the first opening and a second lid part configured to be capable of opening and closing the second opening.

10. The housing device according to claim 9, wherein the first guide includes the first lid part, and/or the second guide includes the second lid part.

11. The housing device according to claim 1, wherein the first guide and the second guide are different in a dimension of the guide.

12. The housing device according to claim 11, wherein the first guide and the second guide are different in a dimension of an area for assisting the insertion of the storage battery.

13. The housing device according to claim 1, wherein at least one of the first guide and the second guide includes a storage battery holding part for holding the storage battery.

14. The housing device according to claim 13, wherein a shape of an inner surface of the storage battery holding part of the first guide is different from a shape of an inner surface of the storage battery holding part of the second guide.

15. The housing device according to claim 1, further comprising:
   a charging part which charges the storage battery.

16. The housing device according to claim 1, wherein the first guide and the second guide are different in a shape of the guide.

17. The housing device according to claim 1, wherein the first guide and the second guide are different in a manner in which the guide holds the storage battery.

18. The housing device according to claim 1, wherein the first guide and the second guide are different in a path of movement of the storage battery assisted by the guide.

19. The housing device according to claim 1, wherein the first guide and the second guide are different in a shape of a surface on which the storage battery abuts.

20. The housing device according to claim 1, wherein the first guide and the second guide are different in a shape of a guide groove provided in the guide.

21. The housing device according to claim 1, wherein the first guide and the second guide are different in a dimension of the guide groove provided in the guide.

22. The housing device according to claim 1, wherein the first guide and the second guide are different in a length of the guide.

23. The housing device according to claim 1, wherein the first guide is normally housed inside the first housing part, and is configured to slide along a bottom surface or a side surface of the first housing part such that at least a part of the first guide protrudes to an outside of the first housing part,
   the second guide is normally housed inside the second housing part, and is configured to slide along a bottom surface or a side surface of the second housing part such that at least a part of the second guide protrudes to an outside of the second housing part.

24. The housing device according to claim 1, wherein the first guide assists the insertion of the storage battery such that the storage battery can be put on the first guide before inserting the storage battery into the first housing part, and
   the second guide assists the insertion of the storage battery such that the storage battery can be put on the second guide before inserting the storage battery into the second housing part.

* * * * *